United States Patent [19]
Eklund

[11] 4,342,241
[45] Aug. 3, 1982

[54] BAND SAWING METHOD

[75] Inventor: Urban Eklund, Soderhamn, Sweden

[73] Assignee: Kockums Industri AB, Malmö, Sweden

[21] Appl. No.: 873,263

[22] Filed: Jan. 30, 1978

Related U.S. Application Data

[63] Continuation-in-part of Ser. No. 709,852, Jul. 29, 1976, Pat. No. 4,085,636.

[30] Foreign Application Priority Data

Jan. 27, 1977 [SE] Sweden .................................. 7700830

[51] Int. Cl.³ ............................................. B23D 55/08
[52] U.S. Cl. ........................................... 83/56; 83/74; 83/820
[58] Field of Search ...................... 83/56, 72, 74, 809, 83/813, 820, 788, 802, 814

[56] References Cited

U.S. PATENT DOCUMENTS

| | | | |
|---|---|---|---|
| 455,980 | 7/1891 | Ballew | 83/820 |
| 1,499,124 | 6/1924 | Reichmann | 83/820 X |
| 2,914,100 | 11/1959 | Lindholm | 83/74 |
| 3,327,696 | 6/1967 | Aiken | 83/72 X |
| 3,452,734 | 7/1969 | Cleland et al. | 83/814 X |
| 3,882,742 | 5/1975 | Fukami | 83/820 X |

Primary Examiner—James M. Meister
Attorney, Agent, or Firm—Seed, Berry, Vernon & Baynham

[57] ABSTRACT

A band sawing machine has an endless saw blade entrained over two saw pulleys and two blade guides. Lateral displacements of the saw blade to an equilibrium position, as occur during a sawing operation, are countered by a corrective tilt of a planar front face on one or both of the blade guides. The saw blade, by means of tensioning, is constantly pressed against the front face, or faces of the blade guides.

5 Claims, 9 Drawing Figures

BAND SAWING METHOD

PARENTAGE OF APPLICATION

This application is a continuation-in-part of application, Ser. No. 709,852, filed July 29, 1976, now U.S. Pat. No. 4,085,636.

FIELD OF THE INVENTION

The present invention relates to a band sawing machine having an endless saw blade extending over two saw pulleys and two blade guides, and to a method of using such sawing machine.

DESCRIPTION OF THE PRIOR ART

Blade guides such as are known in the prior art of band sawing machines for the most part serve only the passive role of stabilizing the saw blade during operational use. They generally comprise plates which are rigidly connected to the machine stand. In some types of band saws, one or both of the blade guides are displaceable as to height in order to allow the machine to accommodate different trunk diameters.

It has been found that, when sawing, the saw blade consistently tends to assume a so-called equilibrium position, same being the result of the forces of reaction prevailing in the saw blade during sawing due to different effects, as for instance, a somewhat varying feeding direction of the trunks. The equilibrium position can be displaced to either side of a correct position of cut, such as the tangential plane common to the edge surfaces of the blade guides contacted by the saw blade, or a plane parallel therewith.

In theory, the sawblade should be continuously located in the plane which defines the correct position of cut. It is apparent that this lateral displacement has an adverse effect on the sawing process, especially in the degree of accuracy achieved. It has been attempted to neutralize this effect. After sawing, the operator will measure the deviation an thereafter, by a single adjustment, will displace the entire machine stand by a corresponding distance relative to the feed path of the trunk.

But this method is obviously unsatisfactory inasmuch as it is necessary to suffer the occurrence of an incorrectly sawn trunk, for instance after as much as a half hour's work, in order to determine the deviation and to carry out the stand displacement. A great deal of wood is lost as production waste by this procedure. Besides, the sawing operation has to be completely stopped in order to accomplish the measurement and adjustment procedures.

In a patent to F. J. Lindholm, U.S. Pat. No. 2,914,100 of Nov. 24, 1959, the problem is discussed. The tendency of the band saw blade to drift in one direction or the other from the position of correct cut, in a band sawing machine where the blade guides primarily serve the function of twisting the saw blade at right angles relative a position in which the plane of the saw blade is parallel with the common tangential plane (i.e. the position in which the saw blade leaves its pulley) is modified by varying the extent of the twist in dependence upon a sensed displacement from the correct cut position. This sensing is executed by a mechanical means and its result is, in a mechanical way by a further mechanical means, transferred to the blade guides.

The blade guides define a guiding slot between the two spaced adjacent lateral walls through which the running saw blade passes. For the modification of the primary 90° twist, those portions of the blade guides in which the guiding slot is provided are rotatably mounted on a base portion with the aid of matching cylindrical surfaces on each of the portions respectively, the cylindrical surface on the slot portion extending symmetrically on both sides of the saw blade plane, being centered on the row of teeth of the blade traversing the guiding slot. Any modification of the primary twist suggests an arcuate movement of the rear portion of the saw blade only, with the teeth remaining in practically unchanged lateral position.

Such a band sawing machine is not practical for general purposes because, among other reasons, the depth of the cut is limited by the distance between the twisted operative portion of the saw blade between the two blade guides and the opposite run of the saw blade, a distance which will practically correspond to the diameter of the saw pulleys. Obviously, this is quite insufficient for sawing such as long trunks or other elongated objects.

While in some instances it may be sufficient, and even advantageous, to achieve the desired correction by a twisting of the blade in which the position of the row of teeth will remain unchanged, (in other words, where essentially only the inclination of the rest of the blade relative a zero reference plane passing through the row of teeth is changed), it is generally, and in certain specific cases particularly, preferable to have the corrective movement executed as a lateral displacement of at least the row of cutting teeth with the adjacent portion of the blade in a direction opposite to the sensed displacement.

Two ways how to achieve that lateral displacement of the whole saw blade were indicated in my said copending application.

It is obvious that the twisting of a fast running, endless saw blade on two locations at right angles, and the more or less continuous varying of the actual angle of twist, will result in a shortened blade life as compared with a blade which is subjected only to those relatively small position changes necessary for displacement compensation. Such small translational movements are contemplated in said copending application.

SUMMARY OF THE INVENTION

One primary object of this invention is to provide both a method and a machine which contemplates continuously preserving the position of correct cut. There is provided an endless saw blade and a means for sensing the lateral position thereof. The blade has a cutting edge defined by a row of cutting teeth extending between a top line and a root line and is entrained in tensioned state over the flat, cylindrical peripheral edges of two saw pulleys and over a pair of blade guides. Each blade guide has a planar front face over which the blade runs and against which it is constantly pressed essentially along its entire breadth beyond the root line.

The method, in a first aspect thereof, is characterized by the steps of: continuously sensing, via the provided sensing means, any lateral blade displacement during sawing from the position of correct cut, and countering the adverse effect of any such lateral displacement by generating an arcuate corrective movement, in the opposite sense of the sensed lateral displacement. The corrective movement is executed as a tilt (on one or the other side of a plane parallel with a common tangential plane of the two peripheral edges) of the front face on at least one of the blade guides.

Experience has shown that, in many instances, the lateral shift of the row of cutting teeth with the adjacent portions of the blade can be equivalent to the translational lateral shift of the entirety of the blade as described in said copending application. It will be understood that it is often easier to achieve, and more particularly to control, a rotational movement than a translational one.

The method, in a second aspect thereof, is characterized by the corrective tilt movement being effected about an axis located distantly of the row of cutting teeth and the root line thereof. In this way, not only the rest of the blade, but also the row of cutting teeth itself, execute a lateral arcuate movement in an opposite sense to the sensed lateral blade displacement.

The sensing is so carried out that, by means of a suitable sensor (as for instance an inductive coil or the like), the changes in the lateral position of the blade, for instance relative to one of the band guides, are sensed continuously during sawing. The generated signals are fed to an evaluation unit (as for instance a recalculation unit), whereby attention is given to the parameters of the sensor. The evaluation unit provides orders to a driving means of any arbitrary type (as for instance a mechanical, hydraulic, or electromagnetic means), which means tiltingly displaces one portion of the blade guide or of both blade guides on which the planar front face is arranged.

Strictly speaking, the sawn trunk is located in position between the blade guides away from the sensor, and the lateral blade displacement into the equilibrium position should actually be measured in that position. Nevertheless, it is generally sufficient to assume that the displacements at the two positions are proportional to each other. Only in the case of more sophisticated measurements might it be necessary to consider the fact that the bending form of the blade due to the lateral forces between the two band guides is other than linear.

The continuous correction movement of at least one of the two band guides is obtained as a tilting or rotation movement of a head portion of the respective blade guide about an axis parallel to the interconnection line between the centers of the saw pulleys. This axis passes, as shown in a first group of embodiments, through a location which, within reasonable limits, can be arbitrarily chosen so as to include a location within the row of teeth of a saw blade passing over the front face on the respective blade guide, while other arbitrary locations may lie outside the row of teeth and even outside the plane of the blade.

It is thus possible that machines of this first group could be constructed, for cases where such a solution would be considered sufficient, so as to work generally in accordance with the principles of the said Lindholm patent, that is with a stationary row of teeth.

But where a lateral corrective shift is considered necessary, the machines could be constructed as an alternative to the machine according to my said copending application. Because it is to be readily understood that the tilting of a blade about an axis located outside the row of teeth thereof implies an arcuate lateral shift of the row of teeth.

In a second group of embodiments the axis lies forcibly outside the row of teeth, and then, as in the above case, either in the plane of the blade, for instance in the central region of the blade (seen in transversal cross-section), or outside the plane of the blade.

It is to be appreciated that in all such embodiments, the tensioning of the blade over the blade guides is brought into a cooperative relationship with a corrective tilt of the front face. By selecting the location of the axis of this tilt, the character of the corrective movement of the row of cutting teeth ("pure tilt" or "lateral displacement") is determined. Such cooperative relationship implies that, by the corrective tilt, the tensioning is altered at least at one edge of the blade.

DESCRIPTION OF THE SEVERAL EMBODIMENTS

Figure 1:
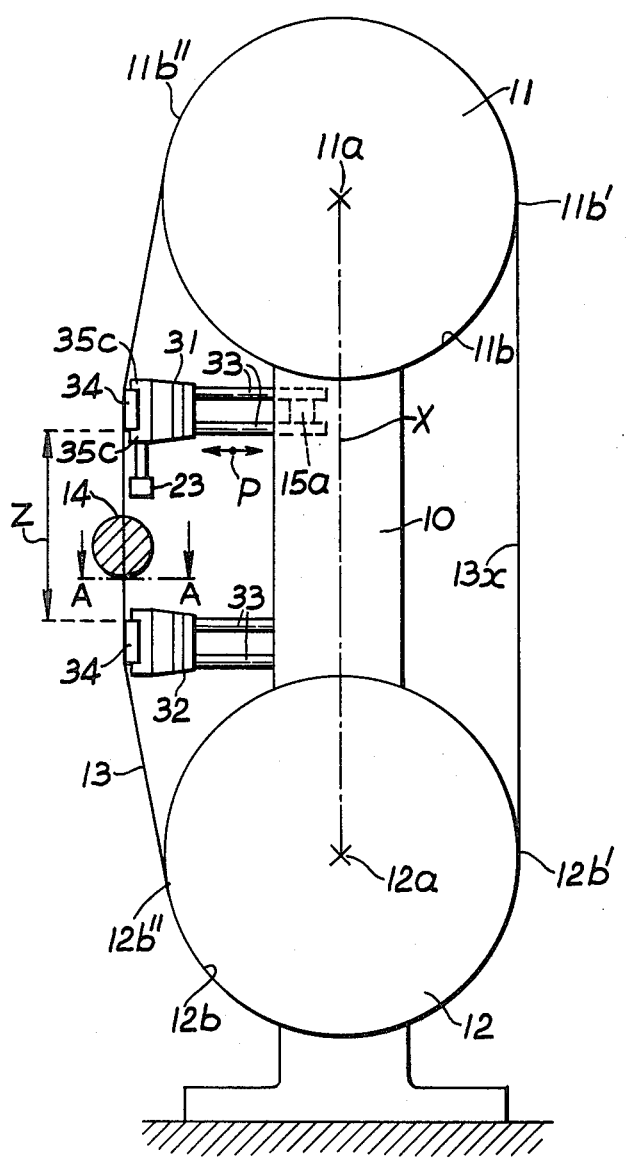
FIG. 1 schematically shows a hand sawing machine generally appropriate for the application of the present invention and provided with blade guides in the embodiment according to FIG. 6.

A band sawing machine is provided in FIG. 1 with a stand 10 supporting an upper saw pulley 11 and a lower saw pulley 12, one of which is driven by a motor, not shown.

An endless saw blade 13 is entrained around pulleys 11, 12, and adjacent to two saw pulleys blade guides 31, 32 over which it runs and by means of which it is tensioned and guided so as to dispose essentially parallel to the interconnection line X between the centers 11a, 12a of the two saw pulleys.

The blade guides, or at least one of them, may be movable relative to stand 10, either as to height to allow the machine to accommodate trunks 14 with different diameters, or transversely in the direction of the arrow P for tensioning purposes, by means of support brackets 33 which are slidably arranged in stand 10 and may be moved relative to an adjusting member 15a. Trunk 14 will be supported by any known type of transport device used in connection with a band sawing machine.

Input values for the continuous corrective movement of one or both blade guides are obtained from a sensor or gauge S (see FIG. 9), and may consist of one or several inductive coils 23 to measure the lateral position changes of blade 13.

Figure 2:
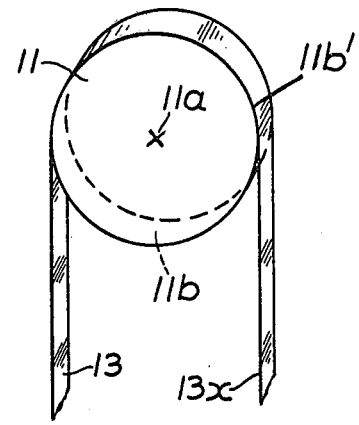
FIG. 2 schematically shows on a reduced scale and in perspective, one saw pulley of the FIG. 1 machine.

Each pulley 11, 12 has a flat peripheral edge 11b (FIG. 2), 12b over which blade 13 runs and which it joins respectively leaves in locations 11b' and 12b'. The rear branch 13x of the saw blade 13 represents the rear common tangential plane of the flat (cylindrical) edges of the two pulleys. An analogic front tangential plane, parallel with the rear plane, can easily be imagined as extending between the front tangential locations 11b'' and 12b''. The plane of blade 13 in the operative or working zone Z thereof, between blade guides 31, 33, is in a zero position parallel with the tangential planes.

Figure 3:
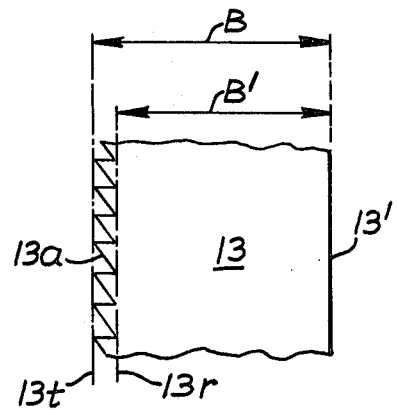
FIG. 3 shows schematically, and on an enlarged scale, a portion of a endless saw blade for use in the FIG. 1 machine.

As shown in FIG. 3, blade 13 has a cutting edge defined by a row of cutting teeth 13a which extend between a top line 13t and a root line 13r. Blade 13 has a total breadth B between top line 13t and its rear edge 13' and a smaller breadth B' between root line 13r and rear edge 13'.

Figure 4:
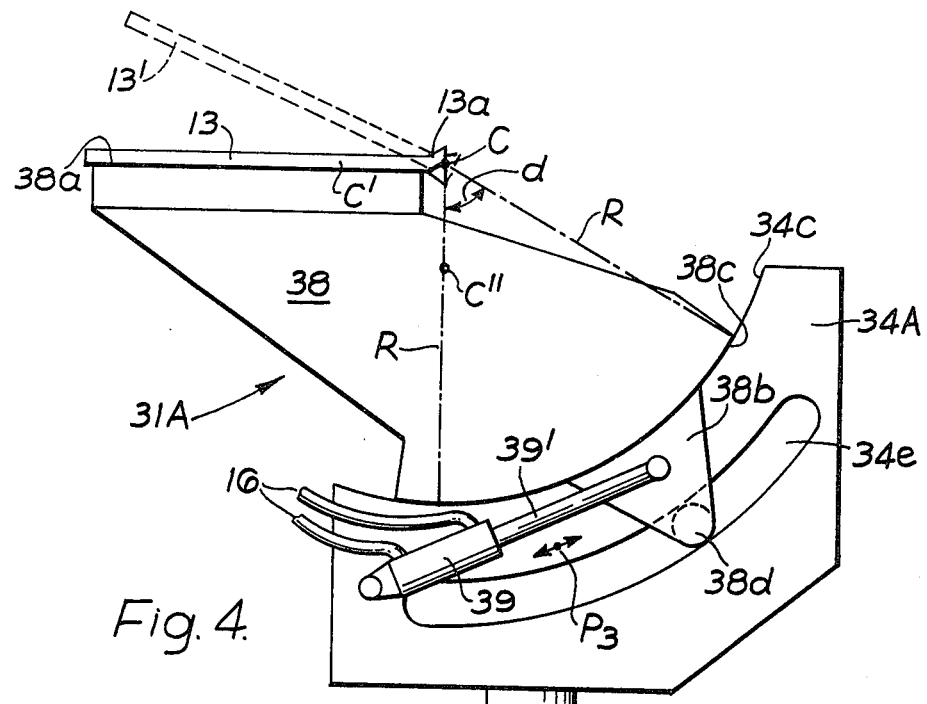
FIG. 4 shows schematically, and on an enlarged scale, a first embodiment of a blade guide in a first group machine.

In the FIG. 4 embodiment, a blade guide 31A, supported on support bracket 33, has a base portion 34A to which on one side the bracket is attached and which on the opposite side is provided with a cylindrical surface 34c having a radius R centered on an axis C. To the body portion 34A is movably connected a head portion 38 with the aid a rear cylindrical surface 38c matching cylindrical surface 34c. On the opposite side, head portion 38 is provided with a planar front surface of face 38a for blade 13. Blade 13, by its normal tension, is constantly pressed against this front face 38a essentially along the whole breadth B' extending beyond root line 13t of the row of cutting teeth 13a.

Head portion 38 is by means of a guiding arm 38b (or two such arms, extending along the upper and lower faces of body portion 34A respectively) and a guiding tap 38d mounted on body portion 34A. Body portion 34A is provided with an arcuate slot 34e which is concentric with the cylindrical surfaces 34c and 38c, and thus also has its center of curvature in C, and the breadth of which is selected so that the guide tap 38d will be, without any substantial play, encompassed by the edges of the slot.

The center of curvature C is located in the row of teeth 13a of blade 13 running over front face 38a, and the rear cylindrical surface 38c on head portion 38 extends with its greater part (i.e. the part included within the angle d subtended by the two radii R), in front of the row of teeth 13. By this arrangement, any rotation of head portion 38 about axis C will cause an arcuate lateral displacement of rear edge 13' of the blade, as is schematically shown in dotted lines, whereas row of teeth 13a will substantially remain stationary. In some instances, this corrective movement will be found sufficient to compensate for a sensed blade displacement.

By appropriately modifying radius R and/or the position of surfaces 34c and 38a in relation one to another, center C easily can be located either elsewhere in the plane of blade 13 (e.g. in the location C'), or even outside the said plane (in the location C''). Then, a rotation of head portion 38 about an axis C' or C'' will imply an arcuate lateral displacement of row of teeth 13, in the same way as in the embodiments subsequently to be described in connection with FIGS. 6 to 8.

Between body portion 34A and head portion 38, a driving means defined by a double-acting cylinder-piston assembly 39 is arranged. Its piston rod 39' is connected to guiding arm 38. By operating this assembly, in response to a sensed displacement of the blade so that piston rod 39' moves in one of the senses of arrow P3, and in predetermined extent, the desired correction is achieved.

The double-acting cylinder-piston assembly 39 is fed by a pair of feeding lines 16 from a source of pressurized medium. A correction effectuated by a virtual shift of the row of teeth usually will call for a smaller rotation of the plane of saw blade than a corresponding correction (i.e. for the elimination of an identical sensed displacement of the saw blade), when the correction is effectuated without a shift of the row of teeth, (only by a tilt of the remaining portion B' of the saw blade).

Figure 5:
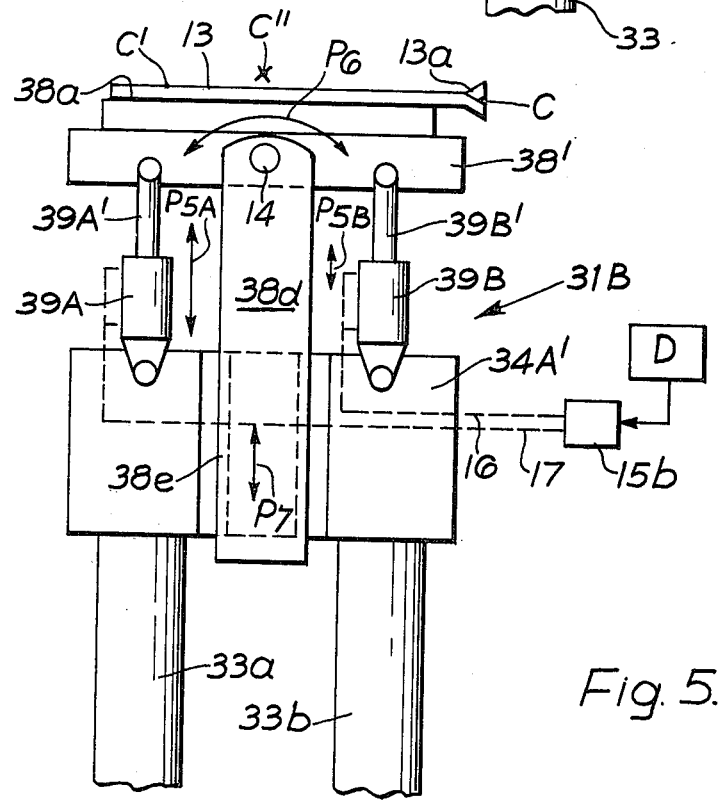
FIG. 5 shows schematically, and on an enlarged scale, a second embodiment of a blade guide in a first group machine.

According to FIG. 5, a blade guide 31B has a body portion 34A' which is connected to stand 10 by bracket means 33a, 33b which now are arranged horizontally, one next to the other. A head portion 38' with the planar front face 38a is movably connected to body portion 34A' by means of two hydraulically or pneumatically-driven double-acting cylinder-piston assemblies 39A, 39B which are disposed in horizontal disposition one next to the other. The assemblies are pivotally connected as well to the body portion 34A'', as to head portion 38'. Between assemblies 39A, 39B, an elongated guiding rod 38d is at one end pivotally connected to head portion 38' by means of a pivot tap 14, while its other end is slidably guided relative to body portion 34A' (e.g. with the aid of a dovetailed guide 38e, as shown or in a similar manner, such as in a bore in the body portion 34A').

Figure 9:
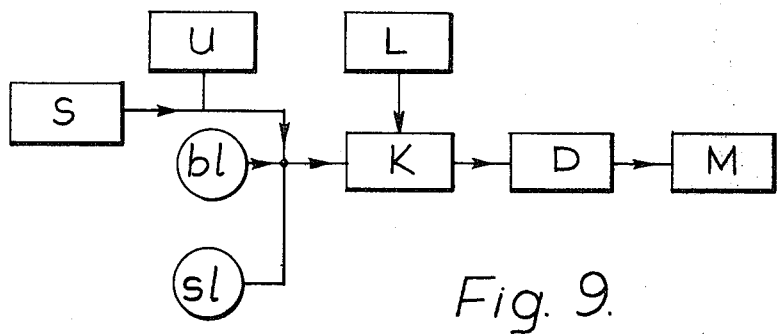
FIG. 9 shows a functional block diagram for the machine according to the invention.

Double-acting cylinder-piston assemblies 39A and 39B with piston rods 39A' and 39B' are, via two schematically shown pairs of feeding lines 16, 17, fed from a control unit 15b which in turn receives a pressurized medium from a source (not shown) in dependence on the sensed displacement of the blade, in accordance with an operative signal generated in a recalculator D (see also FIG. 9).

The control unit 15b is arranged so that in a manner known in the art, the power supply is not equal to both cylinder-piston assemblies, but takes place in a predetermined ratio, e.g. in greater extent to assembly 39A than to assembly 39B, as is schematically demonstrated in the drawing by the unequally long arrows $P_{5A}$ and $P_{5B}$.

The ratio can be selected so as to place the axis of rotation of head portion 38' in a selectable location, inclusive of a location C in the row of teeth 13a of blade 13 passing over front face 38a, or a location C' elsewhere in the plane of the blade, or a location C'' outside the plane of the blade.

Guide rod 38d has a stabilizing function and is passively entrained in its guiding 38e in one of the senses of the arrow $P_7$ by head portion 38'. Head portion 38' executes hereat a swinging motion in one of the senses of the arrow $P_6$ about pivot tap 14.

More than one guiding member, and more than one cylinder-piston assembly on each side of the guiding member, could be used. Also, cylinder-piston assemblies 39A, 39B could be replaced by other driving means, such as screw-bolt-and-nut assemblies of the type disclosed in connection with FIG. 8 driven by separate electrical motors.

Figure 6:
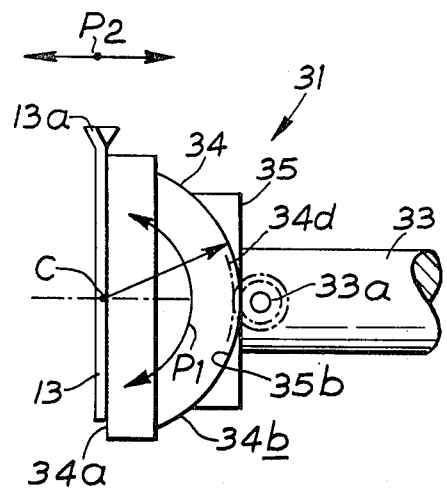
FIG. 6 is a schematical view, on an enlarged scale, in the direction of the arrows A in FIG. 1, and shows a first embodiment of a blade guide in a second group machine.
Figure 7:
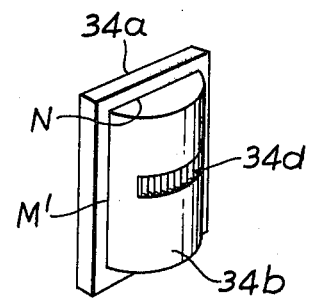
FIG. 7 shows in perspective and in a geometrical abstraction on a reduced scale the rear cylindrical surface of the head portion of the FIG. 6 blade guide.

According to FIGS. 6 and 7, the blade guide 31 is provided with a head portion 34 which at the front side thereof is defined by the planar front surface 34a over which blade 13 runs, and the rear side of which is defined by a cylindrical rear surface 34b, the center of curvature of which preferably, but not necessarily, is located in the blade plane, i.e. in practice at the planar front face 34a.

Head portion 34 abuts slidingly against a corresponding cylindrical surface 35b on a body portion 34. The two portions 34 and 35 are adjustably attached to each other, for instance in such a way that body portion 35 is provided with upper and lower abutments 35c (FIG. 1) which stabilize the position of the head portion 34 relative the body portion in the height direction.

The tensioned blade 13 itself presses head portion 34 against the body portion 35 and therefore stabilizes the position thereof in the direction of bracket 33.

Within the body portion 35 or the bracket 33, a gear 33a is arranged which firstly meshes with a row of gear teeth 34d, for instance arranged countersunk in the cylindrical surface 34b, and secondly is driven by a not disclosed driving means controlled by orders from a recalculation unit D (FIG. 9).

FIG. 6 discloses that the rotation of head portion 34 in the direction of arrow $P_1$ implies that blade 13 with row of teeth 13a is laterally shifted in the direction of arrow $P_2$. It should be noted that each one of the movements always falls within the magnitude range of some millimeters, but on both sides of the zero position, i.e. a position in which the plane of the saw blade is parallel with the tangential planes.

Bracket means 33 are stationary during operation, but can be made adjustable as well for adaption to different saw blades, as to the correct tensioning and/or to trunks with different diameters (by extension or retraction in the first case, and by lowering or lifting in the other case).

The rear cylindrical surface 34b is parallel with the planar front face 34a in a double sense. For one thing, the axial generatrices thereof, such as the edge line M' (FIG. 7), are parallel with corresponding generatrices of the front face 34a, and secondly, the chord N of the cylindrical surface 34b also is parallel with a corresponding generatrix of the planar front face 34a.

Under these conditions, in the embodiment according to FIG. 6, center C never can, in contradistinction to the FIG. 4 embodiment, where only the first but not the second condition applies, be located in row of teeth 13a (although it may be located outside the plane of the blade if the radius of curvature of the cylindrical surfaces 34b, 35b is altered).

Figure 8:
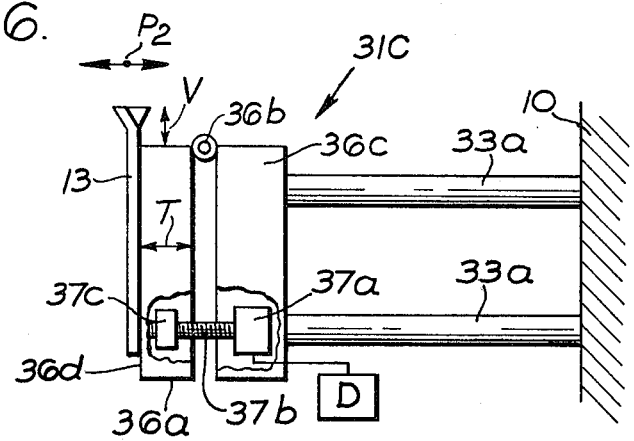
FIG. 8 shows schematically and on an enlarged scale, a second embodiment of a blade guide in a second group machine.

According to FIG. 8, the blade guide 31C has a head portion 36a which by means of a hinge device or similar 36b is connected pivotally to the body portion 36c of the blade guide which by bracket means 33a is attached to the machine stand 10 (FIG. 1). Within or on the body portion 36c, there is a driving means (for instance an electrical motor 37a) which rotates a screw 37b that at the opposite end meshes with a nut 37c rotatably, but fixedly as to position, arranged on or in the head portion 36a. Electrical motor 37a in its turn is controlled by operative signals from the recalculator D (see also FIG. 9). The result obtained is a rotation of the head portion 36a with the planar front face 36d and thereby also a rotation of blade 13 around an axis represented by the hinge 36b. This rotation implies that blade 13 aims at cutting in an inclined direction, and the row of teeth 13a is laterally shifted in one of the senses of arrow $P_2$. It will be understood from the drawing that the extent of this laterial shift depends on the protrusion V of the top line 13t (FIG. 3) of the row of teeth 13a from the front edge of the head portion 36a, and on the thickness T of said portion, as both these magnitudes determine the distance between the top line and the pivot axis represented by hinge device 36b. As both the said magnitudes in practice can be selected rather small, the embodiment according to FIG. 8 can functionally be assimilated to the embodiments of the first group according to FIGS. 4 and 5.

In FIG. 9, a functional block diagram is shown in order to achieve compensation for the movements of the blade from the equilibrium position. A sensor S (see for instance 23 in FIG. 1) measures the position of the blade laterally relative the blade guide 31. A settable compensator U corrects the output signal from the sensor relative machine constants, etc. (compensation for geometry). This corrected value is supplied together with information bl on the position of the blade guide relative to stand 10 and information sl on the position of stand 10 relative to the work 14 to be sawed, and said values are supplied as the actual values to a comparator K, which additionally from a control unit L is supplied with the desired position of the blade and the row of teeth thereon, respectively, relative to the center line of the work to be sawed, as a set value. The output value from the comparator K is supplied to a recalculator D where the difference between the actual value and the set value is recalculated to an operative signal which is supplied to the driving means M and the members thereof which provide the displacement of the head portion of the blade guide or blade guides, such as the gear 10a or driving member 15 according to FIG. 1, or the gear 33a (FIG. 6), the motor 37a and the screw bolt 37b (FIG. 8), the cylinder-piston assemblies 39A, 39B and the control unit 15b (FIG. 5) or the cylinder-piston assembly 39 (FIG. 4), although for simplicity this connection is shown only in FIGS. 5 and 8 in relation to the control unit 15b and the electrical motor 37a.

I claim:

1. In a method of continuously preserving the correction position of a cut on a saw blade which has a row of teeth extending from a front edge to a root line, said blade being installed in a band sawing machine so that it runs over respective flat peripheral edges of two spaced-apart pulleys that are rotatable about respective parallel rotational axes mounted in a common plane, said blade being guided by spaced-apart blade guides having a guide surface which is substantially parallel to said common plane, said blade being pressed by inherent tension against said guide surfaces such that said blade is free of substantial twist, said method comprising the steps of: continuously sensing during sawing any lateral displacement of a portion of the saw blade between said blade guides from a position of correct cut, countering adverse effect of the lateral displacement by applying an arcuate corrective force to at least one of said blade guides which is proportional to the lateral deviation of the blade from the position of correct cut to cause said blade to move laterally in proportion to and in the opposite sense of the sensed lateral displacement of the blade irrespective of the direction of the sensed lateral displacement.

2. The method according to claim 1 wherein the arcuate corrective force is effectuated about an axis located spacedly from the row of cutting teeth of the blade and the root line thereof so that the row of cutting teeth executes a lateral arcuate movement in opposite sense to the sensed lateral displacement of the blade.

3. A method of continuously preserving the correct position of a cut formed by a band sawing machine having an endless blade with a row of teeth formed along one edge thereof, said blade being entrained around the opposed peripheries of a pair of spaced-apart pulleys rotatable about respective parallel rotational axes, with the portion of said blade forming said cut lying in a plane which is substantially parallel to said rotational axes so that said blade is free of substantial twist, said method comprising measuring the position of the portion of said blade forming said cut in a lateral direction perpendicular to said cut and, in response to lateral movement of said blade away from said correct position, applying a twisting force to said blade about its longitudinal axis, said force having a magnitude that is proportional to the lateral movement of said blade and a direction causing the teeth of said blade to face away from said lateral movement, thereby causing said blade to move laterally in proportion to and in the opposite sense of the sensed lateral displacement of the blade irrespective of the direction of the sensed lateral displacement.

4. The method of claim 3 wherein the twisting force applied to said blade responsive to lateral movement of said blade is effected along an axis which is spaced from the teeth of said blade in a direction perpendicular to a plane in which the rotational axes of said pulleys occupy, thereby causing the teeth of said blade to move laterally in a direction opposite the direction of lateral movement of said blade.

5. The method of claim 3 wherein the twisting force applied to said blade responsive to lateral movement of said blade is effected along an axis which is identical to the location of said teeth such that the lateral position of said teeth remains fixed as said blade undergoes twisting.

* * * * *